United States Patent
Maehata et al.

(10) Patent No.: US 8,744,002 B2
(45) Date of Patent: Jun. 3, 2014

(54) PEAK POWER SUPPRESSING CIRCUIT AND COMMUNICATION DEVICE HAVING THE SAME

(75) Inventors: Takashi Maehata, Osaka (JP); Mikhail Illarionov, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/575,009

(22) PCT Filed: Nov. 15, 2010

(86) PCT No.: PCT/JP2010/070284
§ 371 (c)(1),
(2), (4) Date: Jul. 24, 2012

(87) PCT Pub. No.: WO2011/104951
PCT Pub. Date: Sep. 1, 2011

(65) Prior Publication Data
US 2012/0300824 A1  Nov. 29, 2012

(30) Foreign Application Priority Data
Feb. 24, 2010 (JP) .................................. 2010-039079

(51) Int. Cl.
H04K 1/02 (2006.01)
H04L 25/03 (2006.01)
H04L 25/49 (2006.01)

(52) U.S. Cl.
USPC ........................... 375/297; 375/260; 375/267

(58) Field of Classification Search
USPC .................................. 375/260, 267, 295, 297
See application file for complete search history.

(56) References Cited

U.S. PATENT DOCUMENTS

| | | | |
|---|---|---|---|
| 6,175,270 B1 | 1/2001 | Vannucci | |
| 6,891,902 B2* | 5/2005 | Talwar et al. | 375/296 |
| 2003/0054851 A1* | 3/2003 | Jo et al. | 455/522 |
| 2005/0238110 A1* | 10/2005 | Yun et al. | 375/260 |
| 2008/0101502 A1* | 5/2008 | Navidpour et al. | 375/296 |
| 2008/0200126 A1 | 8/2008 | Okada et al. | |
| 2009/0060073 A1 | 3/2009 | Yano et al. | |

FOREIGN PATENT DOCUMENTS

| | | |
|---|---|---|
| JP | 11-312928 A | 11/1999 |
| JP | 2004-135087 A | 4/2004 |
| JP | 3853509 B2 | 12/2006 |
| JP | 3954341 B2 | 8/2007 |
| JP | 2008-199490 A | 8/2008 |
| JP | 2009-055558 A | 3/2009 |
| JP | 2009-200840 A | 9/2009 |

* cited by examiner

Primary Examiner — Chieh M Fan
Assistant Examiner — Freshteh N Aghdam
(74) Attorney, Agent, or Firm — McDermott Will & Emery LLP

(57) ABSTRACT

A peak power suppressing circuit can suppress a peak power of an IQ (In-phase and Quadrature-phase) baseband signal more assuredly. In particular, the peak power suppressing circuit performs a clipping process on an IQ baseband signal. The suppressing circuit includes a power calculation section that calculates an instantaneous power P of an IQ baseband signal, a pulse retention section that retains a cancellation pulse S that has a frequency component in a frequency band B of the IQ baseband signal and a frequency component outside the frequency band, and a clipping processing section that subtracts, from an IQ baseband signal whose instantaneous power P that has been calculated is greater than a predetermined threshold Pth, cancellation signals Ic and Qc obtained by multiplying increments ΔI and ΔQ of the IQ baseband signal from the threshold Pth by the cancellation pulse S.

8 Claims, 15 Drawing Sheets

(a) SINC WAVEFORM (b) CHEBYSHEV WAVEFORM (c) TAYLOR WAVEFORM

PEAK POWER SUPPRESSING CIRCUIT AND COMMUNICATION DEVICE HAVING THE SAME

RELATED APPLICATIONS

This application is the U.S. National Phase under 35 U.S.C. §371 of International Application No. PCT/JP2010/070284, filed on Nov. 15, 2010, which in turn claims the benefit of Japanese Application No. 2010-039079, filed on Feb. 24, 2010, the disclosures of which Applications are incorporated by reference herein.—

TECHNICAL FIELD

The present invention relates to a peak power suppressing circuit that performs a clipping process on an IQ baseband signal, and a communication device having this circuit. More specifically, the present invention relates to improvement of a clipping method for appropriately limiting an amplitude of an IQ baseband signal to be inputted to a power amplification circuit in a radio transmitter.

BACKGROUND ART

For example, in a method of modulating a transmission signal by using a plurality of carrier waves, such as OFDM (Orthogonal Frequency Division Multiplex) and W-CDMA (Wideband Code Division Multiple Access), there may be a case where phases of carrier waves overlap each other, thereby causing the transmission signal to have a large peak power.

On the other hand, although a superior linearity is required for a power amplifier, when a signal having a power exceeding a maximum output level is inputted, the output is saturated and nonlinear distortion increases.

Thus, when a signal having a large peak power is inputted in a nonlinear amplifier, nonlinear distortion occurs in an output signal, which causes degradation of reception characteristics on a receiver side and out-of-band radiation.

In order to prevent nonlinear distortion from increasing relative to a peak power, a power amplifier having a wide dynamic range is necessary. However, if the dynamic range of an amplifier is widened for a peak power that does not occur so often, the ratio of a peak power in a short time to an average power of a waveform on a time axis (PAPR: Peak to Average Power Ratio) increases, and thus, the power efficiency decreases.

Therefore, with respect to a signal having a large peak power that does not occur so often, it is more reasonable to suppress the peak power before the signal is inputted to the amplifier, than to directly input the signal to the amplifier. Thus, there exists a device that performs a clipping process that instantaneously applies, in order to suppress a peak power of an IQ baseband signal before its power is amplified, an amplitude in an inverse direction to the IQ baseband signal having a peak power exceeding a predetermined threshold.

Since such a clipping process is a process that applies an impulse-shaped signal in an inverse direction on the time axis, the clipping process is equivalent to applying a noise of a wide frequency band on the frequency axis. This causes a problem that a noise occurs outside the frequency band in a case where only a clipping process is simply performed.

Therefore, for coping with the problem of the out-of-band radiation, there are known peak power suppressing circuits referred to as NS-CFR (Noise Shaping-Crest Factor Reduction) and PC-CFR (Peak Cancellation-Crest Factor Reduction).

Of these, the NS-CFR circuit limits, with respect to a peak component (an increment from a threshold) of an IQ baseband signal having an instantaneous power exceeding the threshold, a frequency band by performing filtering with a low pass filter, a FIR (Finite Impulse Response) filter, or the like, and subtracts the peak component after the frequency band has been limited, from the original IQ baseband signal (see Patent Literature 1).

In the PC-CFR circuit, a cancellation pulse (basic function waveform) that prevents out-of-band radiation even when a clipping process is performed is set in advance, and a cancellation signal obtained by multiplying, by the cancellation pulse, a peak component (an increment from a threshold) of an IQ baseband signal having an instantaneous power exceeding the threshold, is subtracted from the original IQ baseband signal (see Patent Literatures 2 and 3).

CITATION LIST

Patent Literature

[PTL 1] Patent No. 3954341
[PTL 2] Patent No. 3853509
[PTL 3] Japanese Laid-open Patent Publication No. 2004-135087 (FIG. 1 to FIG. 6)

SUMMARY OF THE INVENTION

Problems to be Solved by the Invention

The essence of the clipping process by the CFR circuit is to suppress, at an instant when a peak power of an IQ baseband signal exceeding a threshold occurs, the peak to an order of the threshold by applying a cancellation signal to the IQ baseband signal.

Therefore, in a PC-CFR circuit that cancels a peak by use of a cancellation signal obtained by multiplying an increment by a cancellation pulse, the narrower the pulse width of the cancellation pulse is, the more accurately only the peak at the targeted instant can be canceled, whereby an ideal clipping process can be performed that does not influence a signal waveform after the clipping process.

However, in a conventional PC-CFR circuit, since a cancellation pulse is generated by using only a signal component in a frequency band used in transmission, the pulse width cannot be narrowed very much.

Accordingly, when an IQ baseband signal is canceled by a cancellation signal using the cancellation pulse, the cancellation signal interferes with a signal waveform after the peak, causing a new peak waveform. Thus, a peak power of the IQ baseband signal may not be assuredly suppressed.

In view of the above conventional problem, an object of the present invention is to provide a peak power suppressing circuit and the like that can suppress a peak power of an IQ baseband signal more assuredly.

Solution to the Problems (1) A peak power suppressing circuit of the present invention is a peak power suppressing circuit that performs a clipping process on an IQ baseband signal, including: a power calculation section that calculates an instantaneous power of the IQ baseband signal; a pulse retention section that retains a cancellation pulse that has a frequency component in a frequency band of the IQ baseband signal and a frequency component outside the frequency band; and a clipping processing section that subtracts, from the IQ baseband signal whose instantaneous power that has been calculated is greater than a predetermined threshold, a cancellation signal obtained by multiplying an increment of the IQ baseband signal from the threshold by the cancellation pulse.

According to the peak power suppressing circuit of the present invention, the clipping processing section subtracts, from an IQ baseband signal, a cancellation signal obtained by multiplying an increment of the IQ baseband signal from a threshold by a cancellation pulse that has not only a frequency component in the frequency band of the IQ baseband signal but also a frequency component outside the frequency band.

Accordingly, the cancellation signal having the frequency component outside the frequency band becomes a sharp pulse-shaped signal that can change in a short time period. Therefore, by subtracting this cancellation signal from the IQ baseband signal, it is possible to prevent a new peak waveform from occurring and to suppress a peak power of the IQ baseband signal more assuredly.

(2) Specifically, in the peak power suppressing circuit of the present invention, the cancellation pulse may be configured as a synthesized pulse obtained by synthesizing a basic pulse which has a frequency component in the frequency band and in which a rate of energy localized in a main lobe section is 85 to 99%, and an auxiliary pulse which has a frequency component outside the frequency band that precipitously rises in a time period when the basic pulse peaks, the auxiliary pulse having a narrower pulse width and a lower peak level than the basic pulse.

(3) Frequency components of the auxiliary pulse are in a wide frequency band including the frequency band of the IQ baseband signal. Therefore, when a cancellation signal determined by using a synthesized pulse including the auxiliary pulse is subtracted from the IQ baseband signal, it is equivalent to applying a noise over the wide frequency band. Therefore, unless the levels of the basic pulse and the auxiliary pulse are appropriately set, an error vector magnitude (EVM) in the frequency band may be degraded, and an unnecessary noise may occur due to a leakage power to a frequency band outside the frequency band of the IQ baseband signal.

Therefore, in the peak power suppressing circuit of the present invention, it is preferable that each of the peak levels of the basic pulse and the auxiliary pulse is set so as to satisfy a desired EVM in the frequency band of the IQ baseband signal and to satisfy a desired adjacent channel leakage ratio (ACLR).

(4) More specifically, it is preferable that in a case where the peak level of the basic pulse is defined as α and the peak level of the auxiliary pulse is defined as β, a ratio between the peak levels α and β are set so as to satisfy $0.03 \leq \beta/\alpha \leq 0.1$.

This is because, as described later in the embodiments, since $\beta/\alpha=0.1$ is a maximum ratio that simultaneously satisfies the EVM and the ACLR that are usually required, when an auxiliary pulse satisfying $\beta/\alpha$ is synthesized to the basic pulse, a maximum peak suppression effect can be obtained.

$\beta/\alpha \geq 0.03$ is so set because when $\beta/\alpha$ is less than 0.03, the level of the auxiliary pulse may be too small to appropriately cancel a new peak waveform caused by the subtraction of the cancellation signal.

(5) Preferably, the peak power suppressing circuit of the present invention further includes a threshold updating section that updates the threshold to be used in the clipping processing section, for each control period in which there is a possibility that an average power of the IQ baseband signal temporally fluctuates.

In this case, the threshold updating section updates the threshold to be used in the clipping processing section for each the control period. Therefore, for example, even in a time period where an average power of the IQ baseband signal is relatively small, the instantaneous power can be assuredly suppressed.

(6) Preferably, the peak power suppressing circuit of the present invention further includes a pulse generation section that generates the cancellation pulse so as to be able to cancel the IQ baseband signal in accordance with an average power of each frequency band.

In this case, by using the cancellation pulse generated by the pulse generation section, the transmission power of the frequency band having a smaller average power is not lowered more than necessary by the subtraction of the cancellation signal. Therefore, even in the case of an IQ baseband signal having different average powers for respective frequency bands, the clipping process can be appropriately performed without lowering an SNR.

(7) The communication device of the present invention includes a transmitter including the peak power suppressing circuit of the present invention and the power amplification circuit arranged in a subsequent stage, and has advantageous effects as those in the peak power suppressing circuit of the present invention.

Advantageous Effects of the Invention

As described above, according to the present invention, a clipping process is performed by using a cancellation pulse that has not only a frequency component in the frequency band of an IQ baseband signal but also a frequency component outside the frequency band. Therefore, a peak power of the IQ baseband signal can be suppressed more assuredly.

DESCRIPTION OF EMBODIMENTS

Hereinafter, embodiments of the present invention will be described with reference to the drawings.

First Embodiment

Radio Communication System

Figure 1:
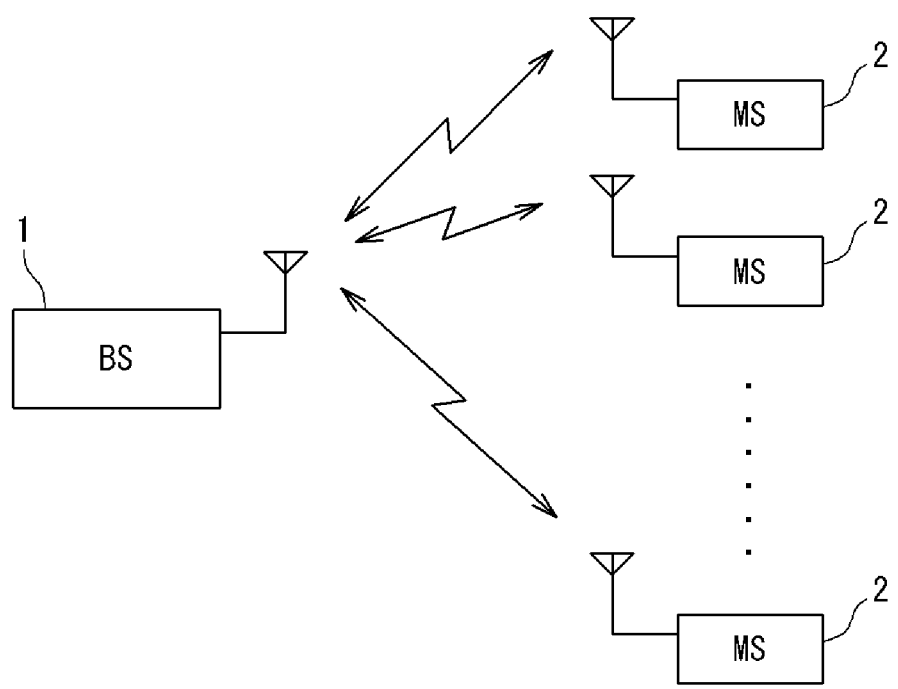
FIG. 1 shows an overall configuration of a radio communication system according to a first embodiment.

FIG. 1 shows an overall configuration of a radio communication system according to a first embodiment, to which system the present invention can be appropriately applied.

As shown in FIG. 1, a radio communication system of the present embodiment includes a base station (BS) 1, and a plurality of mobile terminals (MS) 2 that perform radio communication with the base station 1 in a cell of the base station 1.

In this radio communication system, OFDM is employed as a modulation method between the base station 1 and the mobile terminals 2. This method is a multi-carrier digital modulation method in which transmission data is carried by means of multiple carrier waves (subcarriers). Since the subcarriers are orthogonal to each other, this method has an advantage in that pieces of data can be densely arranged to an extent that they overlap each other along the frequency axis.

Further, the radio communication system of the present embodiment is a system for mobile phones to which LTE (Long Term Evolution) is applied, and communication complying with the LTE is performed between the base station 1 and each mobile terminal 2.

Note that the radio communication system to which the present invention is applicable is not limited to the LTE, and may be the W-CDMA. However, in the following, description will be given assuming that the present invention is applied to the base station 1 employing the LTE.

[LTE Downlink Frame]

Figure 6:
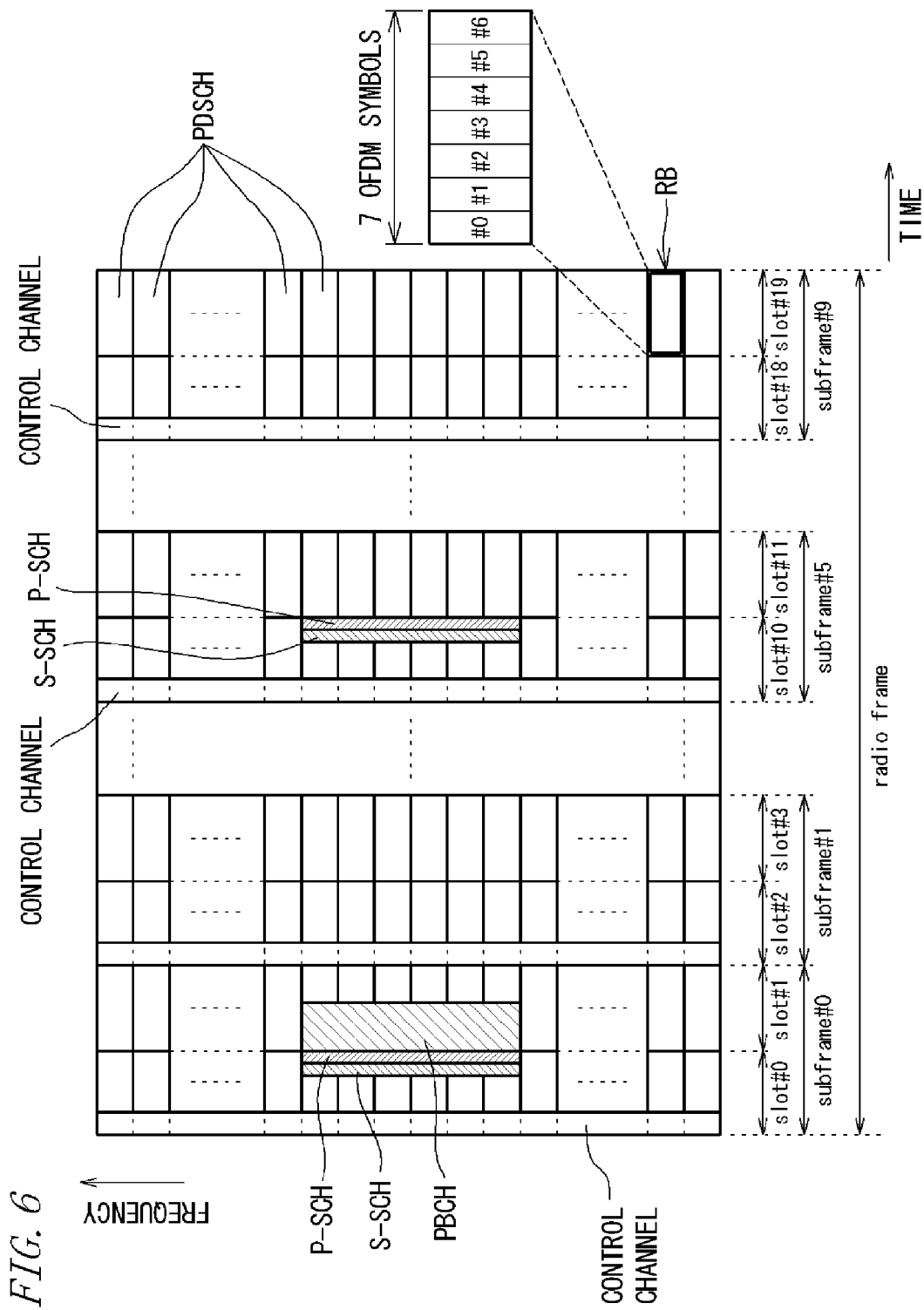
FIG. 6 is a diagram showing a configuration of an LTE downlink frame.

FIG. 6 is a diagram showing a configuration of an LTE downlink frame. In FIG. 6, the vertical axis direction represents frequency, and the horizontal axis represents time.

As shown in FIG. 6, ten subframes in total (subframes #0 to #9) constitute a downlink (DL) frame. Each subframe consists of two slots (slot #0 and slot #1). Each slot consists of 7 OFDM symbols (in the case of Normal Cyclic Prefix).

With reference to FIG. 6, a resource block (RB) which is a basic unit for transmitting data is defined by 12 subcarriers in the frequency axis direction and 7 OFDM symbols (1 slot) in the time axis direction.

Therefore, for example, in a case where the frequency band width of a DL frame is set to 5 MHz, 300 subcarriers are arranged, and thus, 25 resource blocks are arranged in the frequency axis direction.

Note that a transmission time period for one subframe is 1 ms, and in the present embodiment, each of two slots constituting one subframe includes 7 OFDM symbols, and thus, a transmission period (symbol period) for one OFDM symbol is 1/14 ms (=about 0.071 ms).

As shown in FIG. 6, at the beginning of each subframe, a control channel is allocated which is used by the base station 1 in order to transmit, to a mobile terminal 2, information necessary for downlink communication.

DL control information, resource allocation information of the subframe, acknowledgement (ACK) and negative acknowledgement (NACK) in response to a hybrid automatic report request (HARD), and the like are stored in the control channel.

In a DL frame shown in FIG. 6, a PBCH is a physical broadcast channel for notifying terminal devices of bandwidth and the like of the system by means of broadcast transmission, and a primary synchronization channel (P-SCH) and a secondary synchronization channel (S-SCH), which are signals for identifying the base station 1 and a cell, are allocated to the 0th (#0) and the sixth (#5) subframes.

Resource blocks in other areas to which the above described channels are not allocated (unhatched area in FIG. 6) are used as physical downlink shared channels (PDSCH) for storing user data and the like.

The allocation of user data to be stored in the PDSCH is defined by the resource allocation information in the above-described control channel which is allocated at the beginning of each subframe. By using the resource allocation information, a mobile terminal 2 can determine whether data relating to itself is stored in the subframe.

[Configuration of a Transmitter]

Figure 2:
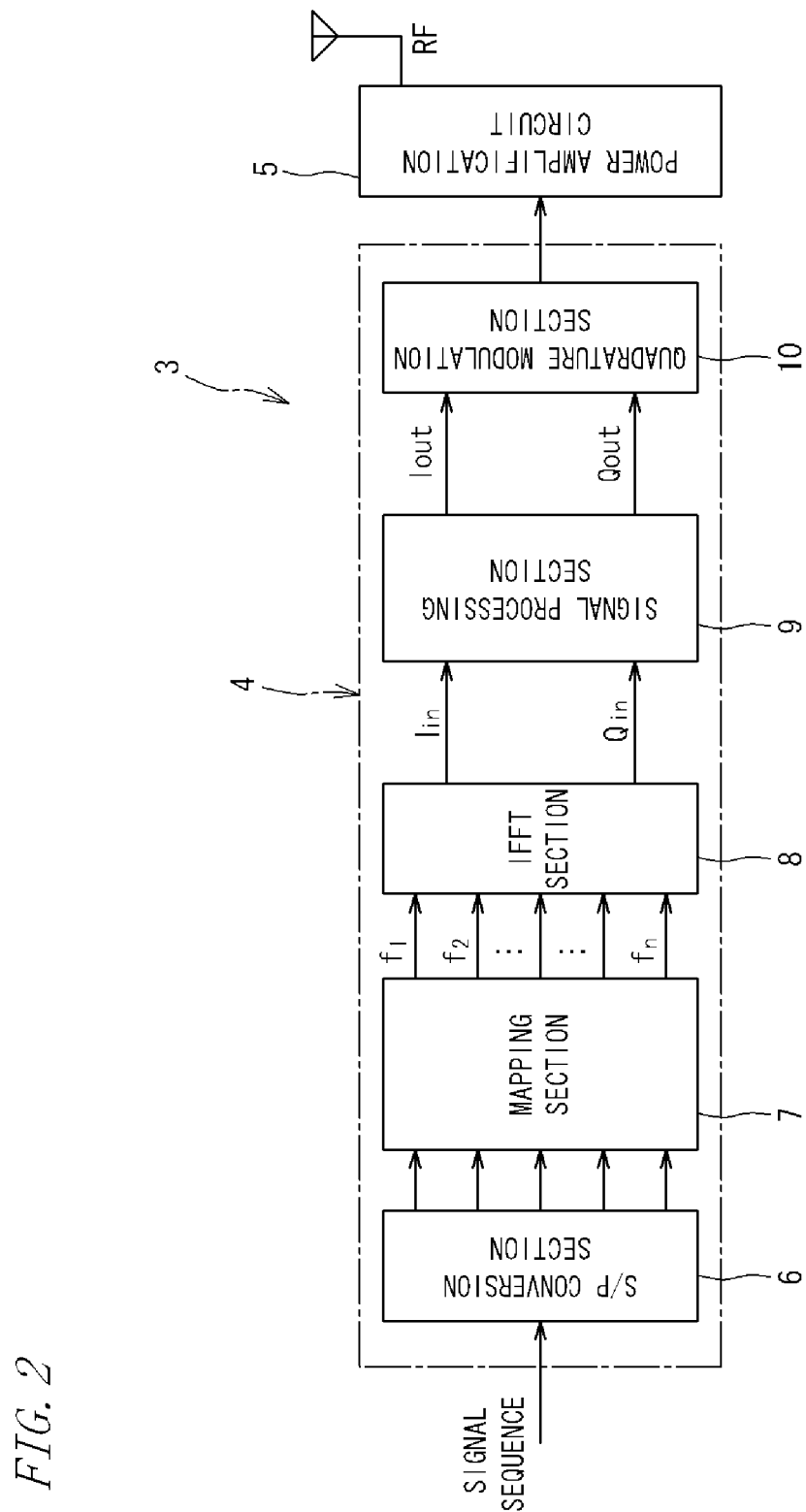
FIG. 2 is a functional block diagram showing main parts of an OFDM transmitter of a base station.

FIG. 2 is a functional block diagram showing main parts of an OFDM transmitter 3 of the base station 1.

The transmitter 3 includes a transmission processor 4, and a power amplification circuit 5, and the transmission processor 4 is, for example, composed of an FPGA (Field Programmable Gate Array) including one or more memories and CPUs.

The FPGA allows configuration information of various types of logic circuits to be set (configured) in advance at the time of shipping the processor or manufacturing the base station 1. Through such setting operations, functional sections 6 to 10 shown in FIG. 2 are configured.

That is, the transmission processor 4 of the present embodiment includes, from left to right, an S/P conversion section 6, a mapping section 7, an IFFT (Inverse Fast Fourier Transform) section 8, a signal processing section 9, and a quadrature modulation section 10, in this order.

A serial signal sequence inputted to the transmission processor 4 is converted into a plurality of signal sequences in the S/P (serial parallel) conversion section 6, and the resultant parallel signal sequences are converted, in the mapping section 7, into a plurality of subcarrier signals f1, f2, . . . and fn each having a combination of a predetermined amplitude and a phase.

The subcarrier signals f1, f2, . . . and fn are converted, by the IFFT section 8, into an I signal and a Q signal serving as a baseband signal that are orthogonal to each other on the time axis.

This IQ signal (Iin,Qin) is subjected to the predetermined signal processing in the signal processing section (a peak power suppressing circuit of the present embodiment) 9 in a subsequent stage. The IQ signal (Tout, Qout) after the signal processing is subjected to quadrature modulation in the quadrature modulation section 10 to be a modulated wave signal, and this modulated wave signal is inputted to the power amplification circuit 5 in a subsequent stage.

Note that the peak power suppressing circuit 9 of the present embodiment performs a clipping process on an IQ baseband signal such that an instantaneous power P of the IQ baseband signal does not exceed a predetermined threshold Pth. Details of the clipping process will be described later.

The power amplification circuit 5 includes a D/A conversion circuit which converts the modulated wave signal inputted from the quadrature modulation section 10 into an analog signal, a converter that up-converts the resultant analog signal into one having an RF, and a power amplifier that amplifies the power of the RF analog signal. The amplified RF signal is transmitted from an antenna.

The power amplification circuit 5 of the present embodiment may employ a fixed voltage system in which the drain voltage of the power amplifier is constant. However, from a viewpoint of realizing a highly-efficient high-frequency amplifier, it is preferable that the power amplification circuit 5 employs an ET (envelope tracking) system.

The power amplification circuit 5 employing the ET system extracts amplitude information (envelope) from the modulated wave signal to be inputted to the power amplifier, and applies a drain voltage that corresponds to the amplitude information to the power amplifier, thereby causing the power amplifier to operate in a substantially saturated state. Accordingly, power loss that occurs in the case of an operation at a fixed voltage is reduced, and a highly-efficient power amplifier can be realized.

[Configuration of the Peak Power Suppressing Circuit]

Figure 3:
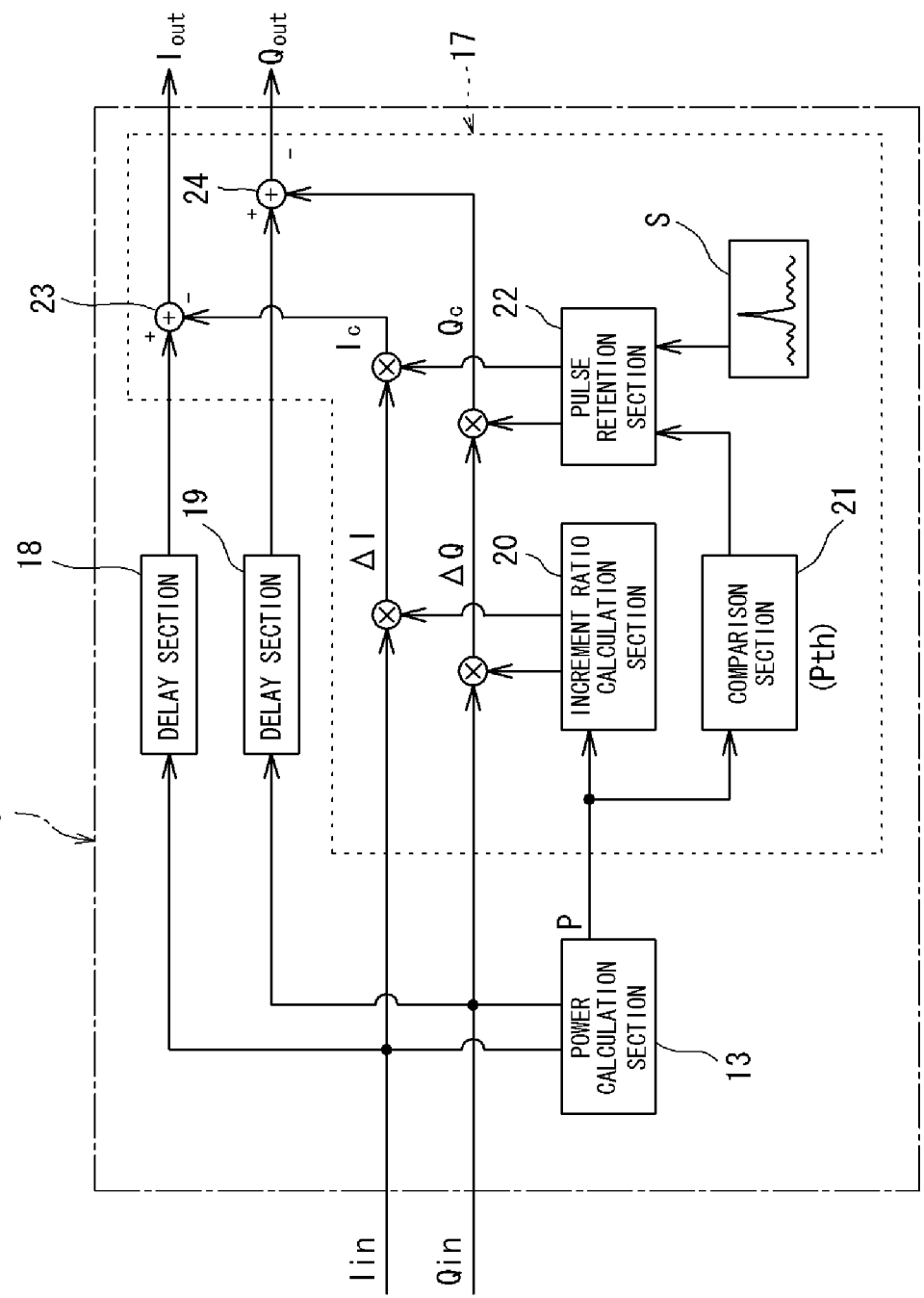
FIG. 3 is a functional block diagram of a peak power suppressing circuit according to a first embodiment.

FIG. 3 is a functional block diagram of the peak power suppressing circuit 9 according to the first embodiment of the present invention.

As shown in FIG. 3, the peak power suppressing circuit 9 of the present embodiment includes a power calculation section 13, a clipping processing section 17, and delay sections 18 and 19.

Of these, the power calculation section 13 calculates an instantaneous power P which is a square sum of an I component and a Q component of an IQ baseband signal.

The clipping processing section 17 of the present embodiment is composed of a PC-CFR circuit, in which, when an instantaneous power P of an IQ baseband signal exceeds a predetermined threshold Pth, cancellation signals Ic and Qc obtained by multiplying increments ΔI and ΔQ from the threshold Pth by a predetermined cancellation pulse S are subtracted from the original IQ baseband signal.

The clipping processing section 17 includes an increment ratio calculation section 20, a comparison section 21, a pulse retention section 22, and adders-subtracters 23 and 24.

Using the instantaneous power P calculated by the power calculation section 13 and the predetermined threshold Pth which has been set in advance, the increment ratio calculation section 20 calculates an increment ratio {1−SQRT (Pth/P)} of the instantaneous power P to the threshold Pth, and multiplies each component (I, Q) of the IQ baseband signal by the increment ratio {1−SQRT (Pth/P)} by using a multiplier.

Thus, increments ΔI and ΔQ of the IQ baseband signal which are amounts exceeding the threshold Pth are calculated based on the following equations. Note that, in this case, SQRT(·) is a function which obtains a square root of a variable in parentheses (the same hereinafter).

$$\Delta I = \{1-\text{SQRT}(Pth/P)\} \times I$$

$$\Delta Q = \{1-\text{SQRT}(Pth/P)\} \times Q$$

The comparison section 21 compares the instantaneous power P calculated by the power calculation section 13 with the threshold Pth, and issues, to the pulse retention section 22, an instruction to output a cancellation pulse S when the instantaneous power P is greater than the threshold Pth.

The pulse retention section 22 has a memory implemented as a dual port RAM or the like, in which a below-described cancellation pulse S, which is a synthesized pulse (see FIG. 4), is temporarily retained. When receiving the instruction from the comparison section 21, the pulse retention section 22 multiplies the above increments ΔI and ΔQ by a cancellation pulse S retained at that time, to calculate cancellation signals Ic and Qc.

When not receiving the instruction from the comparison section 21, the pulse retention section 22 multiplies the increments ΔI and ΔQ by zero.

Therefore, with respect to an IQ baseband signal whose instantaneous power P exceeds the threshold Pth, the cancellation signals Ic and Qc calculated by the following equations are inputted to the adders-subtracters 23 and 24.

$$Ic = \Delta I \times S = \{1-\text{SQRT}(Pth/P)\} \times I \times S$$

$$Qc = \Delta Q \times S = \{1-\text{SQRT}(Pth/P)\} \times Q \times S$$

The delay sections 18 and 19 which are in a previous stage of the adders-subtracters 23 and 24 delay the IQ baseband signal by a time period used for the arithmetic processing performed in the power calculation section 13 and the clipping processing section 17. The adders-subtracters 23 and 24 subtract the cancellation signals Ic and Qc from a component I and a component Q, respectively, of the delayed IQ signal, and output an Tout and a Qout, which constitute an IQ signal after the signal processing.

Through this subtraction, the IQ baseband signal whose instantaneous power P exceeds the threshold Pth is corrected into a signal whose instantaneous power is equivalent to the threshold Pth. An IQ baseband signal whose instantaneous power P is less than or equal to the threshold Pth is directly outputted without being corrected.

Figure 5:
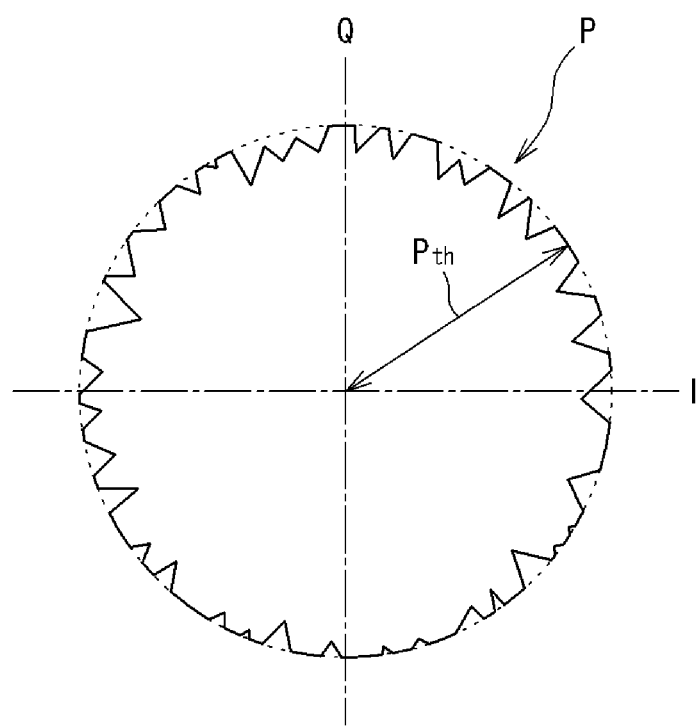
FIG. 5 is a coordinate diagram of an IQ plane indicating relationship between an IQ baseband signal and a threshold.

FIG. 5 is a coordinate diagram of an IQ plane indicating relationship between an IQ baseband signal and the threshold Pth at a time when the clipping process has been performed.

As shown in FIG. 5, signal processing performed by the peak power suppressing circuit 9 of the present embodiment is a clipping process that cuts an outer periphery portion of the instantaneous power P of the IQ baseband signal. Therefore, the PAPR of the power amplification circuit 5 for the power amplifier is reduced, and thus, the power efficiency of the power amplifier is improved.

[Cancellation Pulse]

Figure 4:
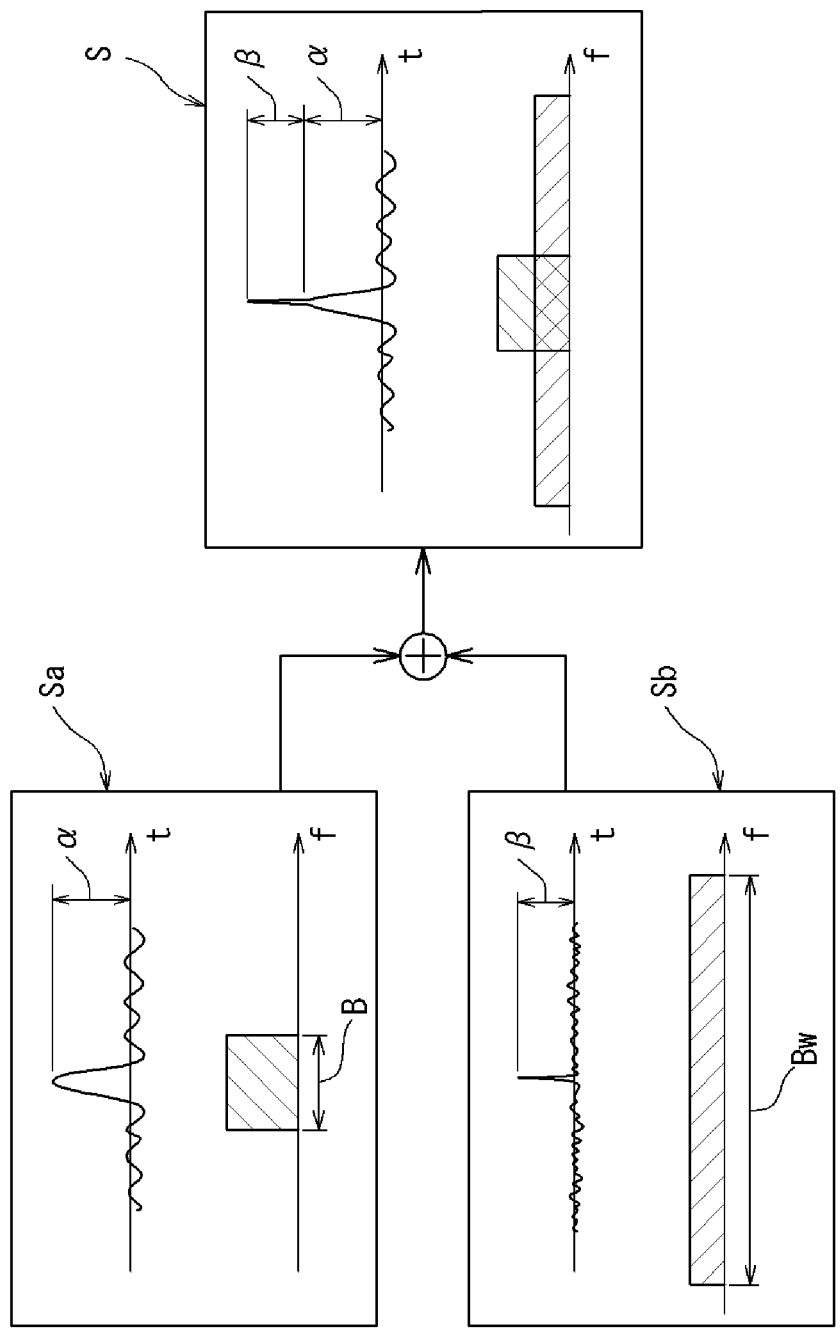
FIG. 4 is a waveform diagram showing how to generate a cancellation pulse.

FIG. 4 is a waveform diagram showing how to generate a cancellation pulse S. As shown in FIG. 4, a cancellation pulse S is a synthesized pulse that is obtained by synthesizing a basic pulse Sa and an auxiliary pulse Sb.

In FIG. 4, a temporal waveform and a frequency spectrum of the basic pulse Sa are shown in an upper left frame, and a temporal waveform and a frequency spectrum of the auxiliary pulse Sb are shown in a lower left frame. A temporal waveform and a frequency spectrum of a cancellation pulse S are shown in a right frame.

The basic pulse Sa is a Sinc waveform obtained by the following manner: a plurality of (for example, N) carrier waves included in a frequency band (hereinafter, this may be referred to as "operating frequency band") B to be used in downlink signal transmission are inputted to the IFFT section 8 with their amplitude being made 1/N and with their phases being made 0, as in the case of Patent Literature 3 (Japanese Laid-open Patent Publication No. 2004-135078). In this case, only the real part I appears in an output from the IFFT section 8 and the imaginary part Q is zero.

Thus, the basic pulse Sa is a waveform (Sinc waveform) consisting of the real part I obtained by subjecting a plurality of subcarriers included in a frequency band B of the IQ baseband signal, to inverse Fourier transformation in the same IFFT section 8, which is also used for the transmission signal.

Therefore, the frequency band of the basic pulse Sa coincides with the operating frequency band B. Thus, even when an IQ signal is clipped using a cancellation signal obtained by multiplying increments of the IQ signal exceeding the threshold Pth by a basic pulse Sa, occurrence of unnecessary frequency components outside the operating frequency band B is prevented.

However, since the basic pulse Sa uses only a signal component within the frequency band B used for transmission, the pulse width thereof on the time axis cannot be narrowed very much as shown in the temporal waveform in the upper left frame in FIG. 4.

Therefore, in a case where only the basic pulse Sa is employed as a cancellation pulse S, and an IQ baseband signal is canceled by use of cancellation signals Ic and Qc which are obtained by multiplying the increments $\Delta I$ and $\Delta Q$ by the cancellation pulse S, the cancellation signals Ic and Qc may interfere with a signal waveform after the peak to cause a new peak waveform, and thus, the peak power of the IQ baseband signal cannot be assuredly suppressed.

Therefore, in the present embodiment, in order to appropriately suppress a peak power to some extent even in a frequency band outside the operating frequency band B, the auxiliary pulse Sb is defined in addition to the basic pulse Sa, and a pulse obtained by synthesizing the auxiliary pulse Sb to the basic pulse Sa is employed as a cancellation pulse S.

As shown in the temporal waveform in the lower left frame in FIG. 4, the auxiliary pulse Sb has a pulse waveform, which is close to a delta function, that precipitously rises in a time period when the basic pulse Sa peaks and that has a very narrow pulse width compared with that of the basic pulse Sa.

Thus, the frequency spectrum of the auxiliary pulse Sb has a very wide frequency band (hereinafter, this may be referred to as "wide frequency band") Bw including the operating frequency band B.

As described above, the cancellation pulse S of the present embodiment is a synthesized pulse obtained by synthesizing the auxiliary pulse Sb to a conventional basic pulse Sa. Therefore, as shown in the frequency spectrum in the right frame in FIG. 4, the cancellation pulse S includes not only a frequency component of the frequency band B of the IQ baseband signal but also frequency components of the wide frequency band Bw outside the frequency band B.

[Peak Level of Each Pulse]

Moreover, in the present embodiment, in a case where a peak level of the basic pulse Sa is defined as $\alpha$, and a peak level of the auxiliary pulse Sb is defined as $\beta$, a ratio between the levels $\alpha$ and $\beta$ are set so as to satisfy $0.03 \leq \beta/\alpha \leq 0.1$. The reason for this will be described below.

As described above, frequency components of the auxiliary pulse Sb are in the wide frequency band Bw which is outside the operating frequency band B of the IQ baseband signal. Therefore, when cancellation signals Ic and Qc determined by using a synthesized pulse including the auxiliary pulse Sb is subtracted from the IQ baseband signal, it is equivalent to applying a noise over the wide frequency band Bw.

Therefore, unless the levels of the basic pulse Sa and the auxiliary pulse Sb are appropriately set, an error vector magnitude (EVM) in the operating frequency band B may be degraded and a high level noise may occur in a frequency band outside the operating frequency band B.

Here, it is assumed that, with respect to the LTE, the Radio Law requires, for example, that 40 dB is secured for the EVM in the operating frequency band B and 60 dB is secured for the adjacent channel leakage ratio.

Thus, allowable power decrease in the operating frequency band B caused by the synthesis of the auxiliary pulse Sb is 20 dB at maximum, which is 0.1 in terms of voltage. Therefore, an allowable peak level (voltage) ratio $\beta/\alpha$ of the auxiliary pulse Sb to the basic pulse Sa is 0.1 at maximum.

On the other hand, when a peak level of the auxiliary pulse Sb is too low, a new peak waveform caused by the subtraction of the cancellation signals Ic and Qc may not be appropriately canceled. However, it is known that a new peak waveform can be canceled as long as the peak level (voltage) ratio $\beta/\alpha$ of the auxiliary pulse Sb to the basic pulse Sa is about 0.03 at minimum.

This concludes that the peak levels $\alpha$ and $\beta$ of respective pulse Sa and Sb are set so as to satisfy $0.03 \leq \beta/\alpha \leq 0.1$.

Effects of the First Embodiment

According to the peak power suppressing circuit 9 of the present embodiment, the clipping processing section 17 subtracts, from an IQ baseband signal, cancellation signals Ic and Qc which are obtained by multiplying increments $\Delta I$ and $\Delta Q$ of the IQ baseband signal from the threshold Pth by a cancellation pulse S (see FIG. 4) which has not only a frequency component in the frequency band B of the IQ baseband signal but also frequency components outside the frequency band.

Accordingly, it is possible to prevent a new peak waveform from occurring as a result of subtraction of cancellation signals Ic and Qc that influence frequency components outside the frequency band, and to suppress the peak power of the IQ baseband signal more assuredly.

Second Embodiment

Figure 7:
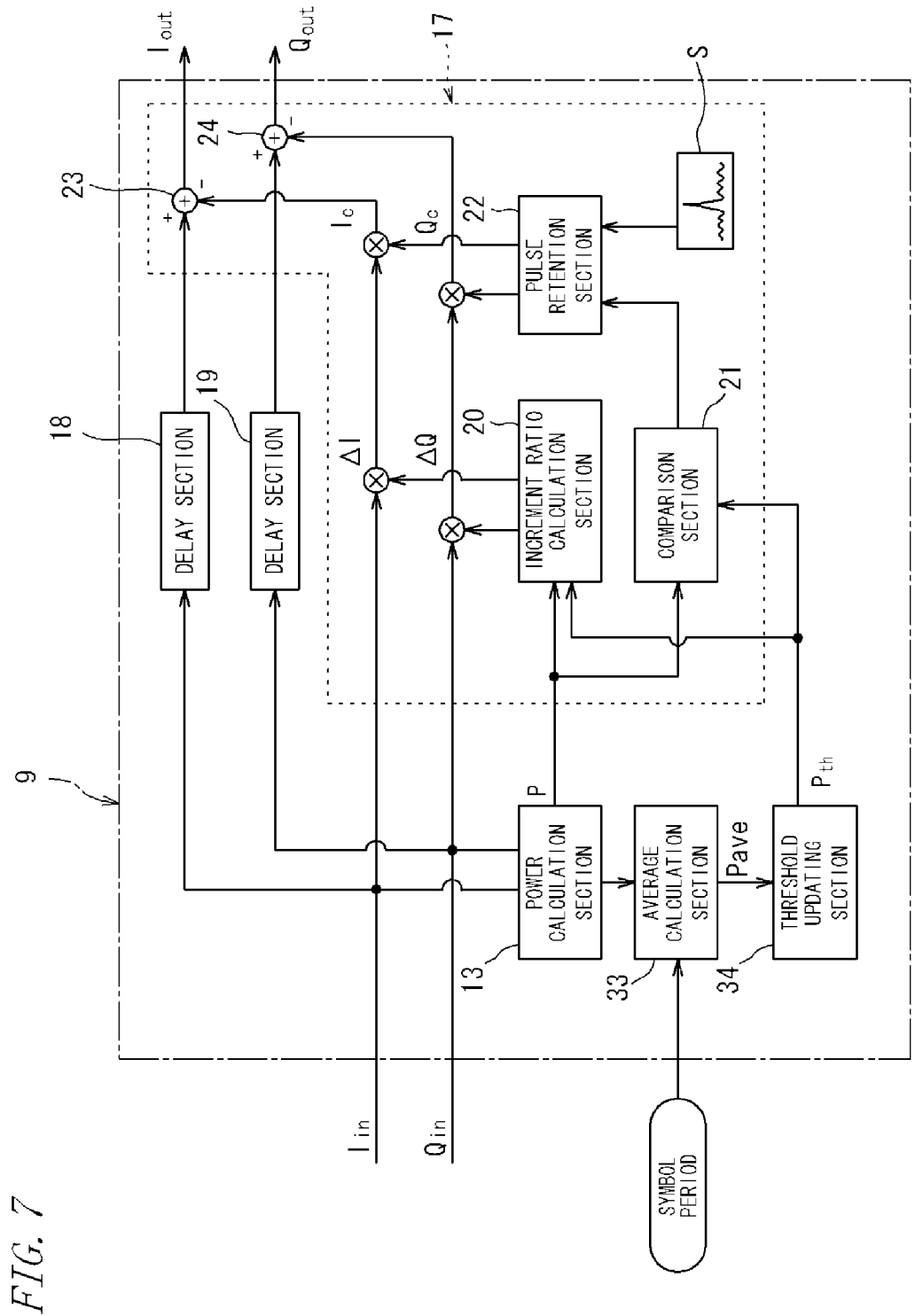
FIG. 7 is a functional block diagram of a peak power suppressing circuit according to a second embodiment.

FIG. 7 is a functional block diagram of a peak power suppressing circuit according to a second embodiment.

As shown in FIG. 7, the peak power suppressing circuit 9 (FIG. 7) of the present embodiment is different from the peak power suppressing circuit 9 (FIG. 3) of the first embodiment in that the peak power suppressing circuit 9 (FIG. 7) of the present embodiment further includes an average calculation section 33 and a threshold updating section 34.

Hereinafter, common components and functions in the present embodiment and the first embodiment are denoted by the same reference characters and description thereof will be omitted. Differences between the present embodiment and the first embodiment will be mainly described.

The average calculation section 33 obtains the symbol period of the OFDM symbol, which is a smallest time unit in which a transmission power can greatly fluctuate, as a control period for calculating an average power Pave of an IQ baseband signal.

That is, the average calculation section 33 obtains instantaneous powers P of the IQ baseband signal from the power calculation section 13, and averages the instantaneous powers P in the symbol period, to calculate an average power Pave of the IQ baseband signal for each symbol period, and outputs the average power Pave to the threshold updating section 34.

The threshold updating section 34 employs a value obtained by multiplying an average power Pave of each symbol period obtained from the average calculation section 33 by a predetermined multiplying rate, as a threshold Pth for the symbol period. For example, when the ratio of a peak power Ppeak to an average power Pave of an IQ baseband signal is to be narrowed to 6 dB, the above-described predetermined multiplying rate is doubled.

By calculating the threshold Pth for each symbol period as described above, the threshold updating section 34 dynamically updates the threshold Pth, and outputs the updated threshold Pth to the increment ratio calculation section 20 and the comparison section 21.

Then, the comparison section 21 compares the threshold Pth obtained from the threshold updating section 34 with the instantaneous power P calculated by the power calculation section 13. When the instantaneous power P exceeds the updated threshold Pth, the comparison section 21 issues, to the pulse retention section 22, an instruction to output a cancellation pulse S.

Figure 8:
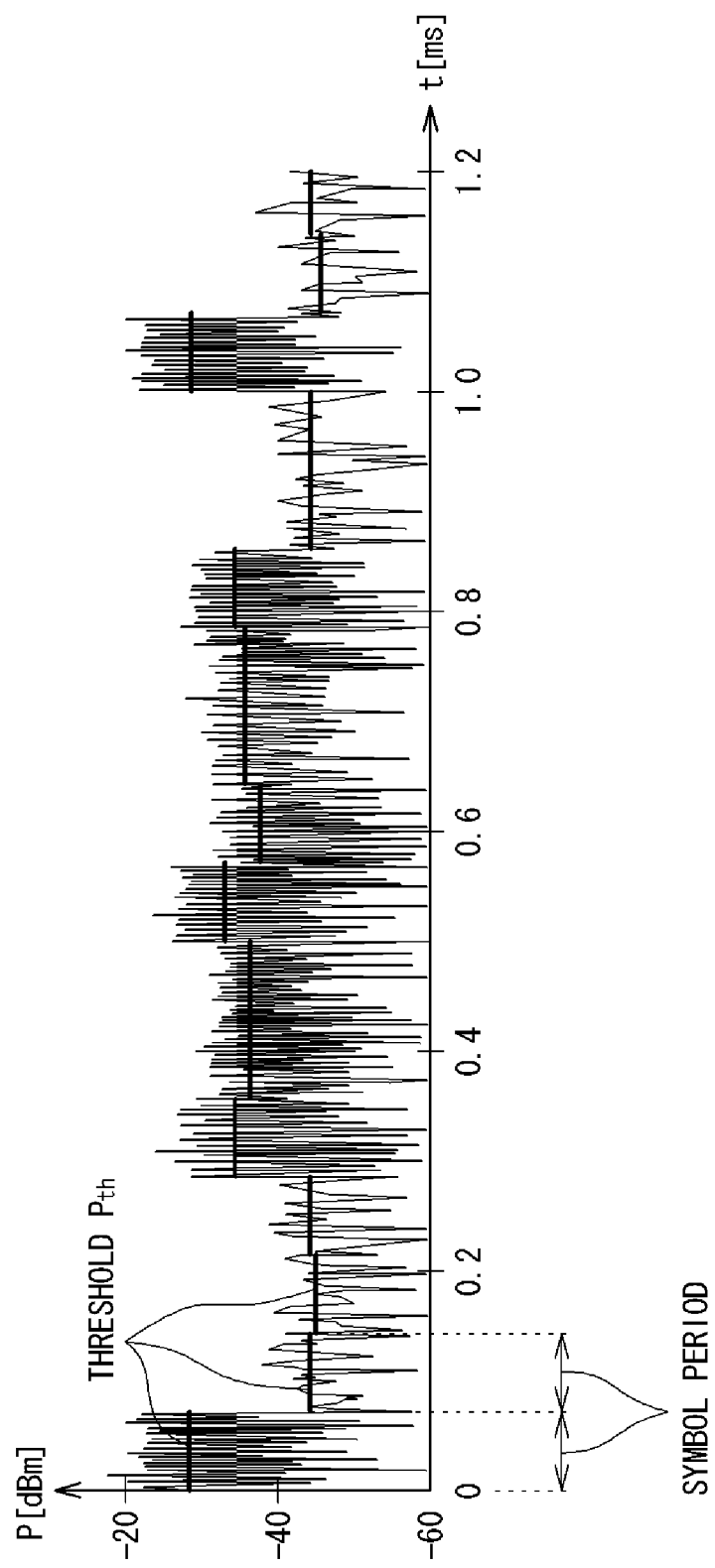
FIG. 8 is a graph showing temporal changes of an instantaneous power of an IQ baseband signal and a threshold sequentially updated.

FIG. 8 is a graph showing temporal changes of the instantaneous power P of an IQ baseband signal and the threshold Pth that is sequentially updated.

As shown in FIG. 8, in the present embodiment, the threshold Pth used in the clipping process in the peak power suppressing circuit 9 is sequentially calculated based on an average power Pave calculated for each symbol period (1/14 ms) and is updated for the symbol period.

Therefore, for example, even when the average power Pave of the IQ baseband signal fluctuates in accordance with a fluctuation of the communication traffic by the mobile terminals 2, the clipping process by the peak power suppressing circuit 9 is always performed. Accordingly, improvement of the power efficiency of the power amplifier brought by a reduced PAPR can be effectively secured.

Moreover, according to the peak power suppressing circuit 9 of the present embodiment, the symbol period of the OFDM, which is a smallest time unit in which a transmission power may fluctuate, is employed as a control period for which the threshold Pth is updated. This is another advantage in that the threshold Pth can be updated accurately and fast.

However, as in the case of the first embodiment, since the resource block (see FIG. 6) is a minimum unit for user allocation in the LTE, 7 OFDM symbols (1 slot) which correspond to a transmission period for the resource block may be employed as a control period for which the threshold Pth is updated.

Third Embodiment

Figure 9:
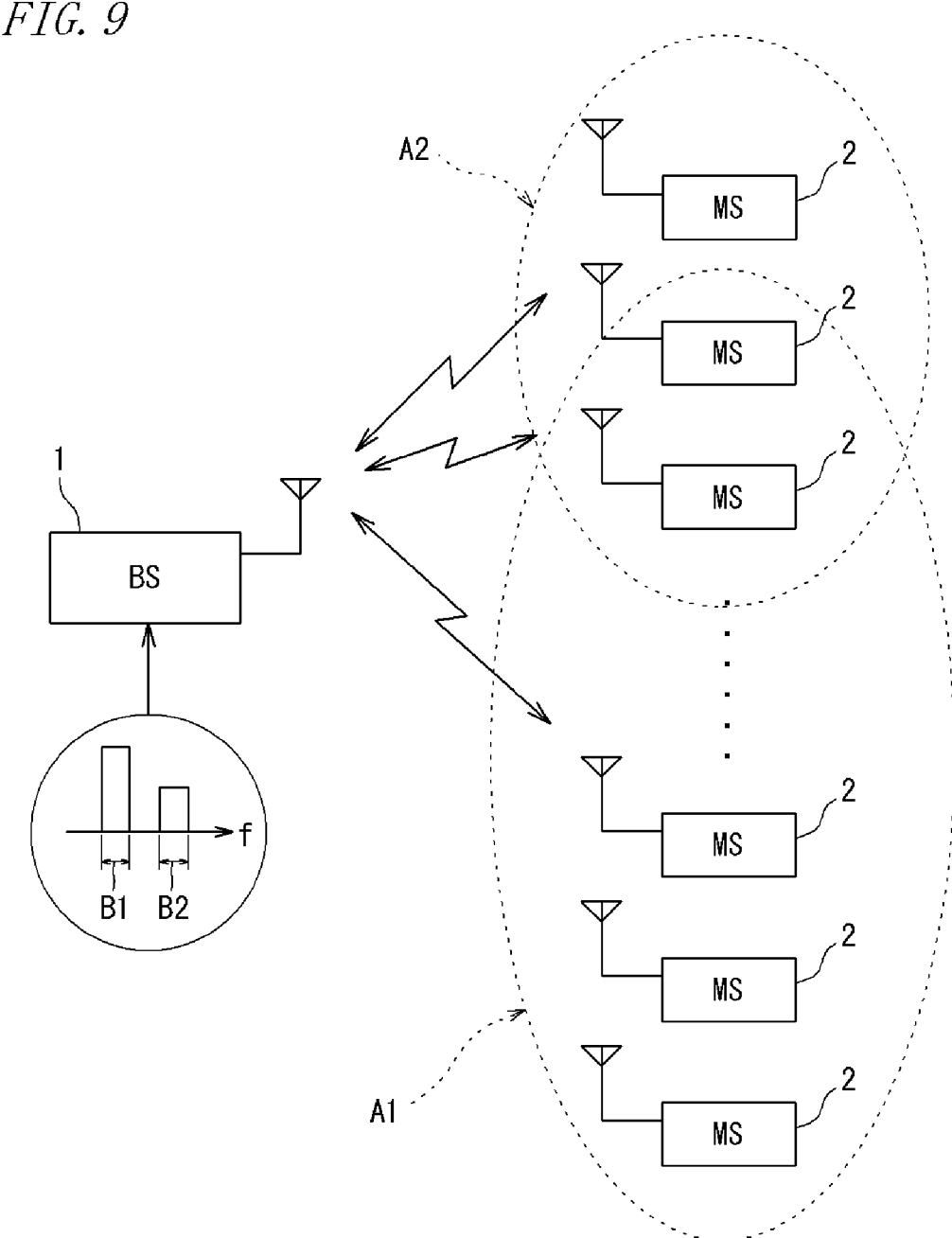
FIG. 9 shows an overall configuration of a radio communication system according to a third embodiment.
Figure 10:
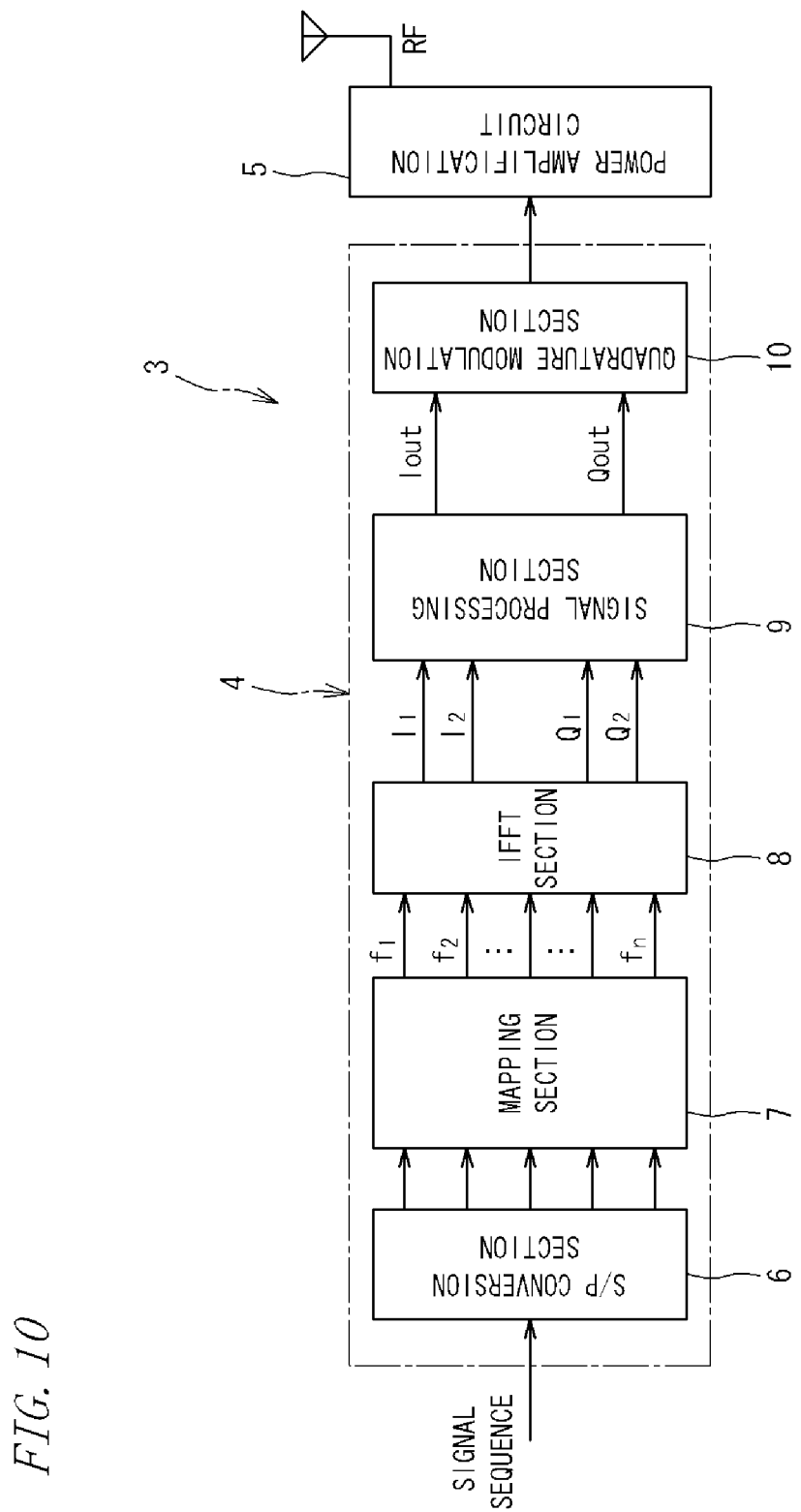
FIG. 10 is a functional block diagram showing main parts of an OFDM transmitter of a base station.

FIG. 9 shows an overall configuration of a radio communication system according to a third embodiment. FIG. 10 is a functional block diagram showing main parts of the OFDM transmitter 3 of the base station 1 in the radio communication system.

Also in the present embodiment, a radio communication system based on the LTE is employed. In the base station 1 based on LTE, frequency bands for downlink frames can be set, for example, in units of 5 MHz, and in a case where downlink signals are transmitted to the mobile terminals 2 in a cell, the transmission power can be changed for each frequency band.

With respect to the base station 1 of the present embodiment, an example is shown where downlink frames are transmitted in two frequency bands B1 and B2. A transmission power for a first frequency band B1 which is a lower frequency band is set to a greater value, and a transmission power for a second frequency band B2 which is a higher frequency band is set to a smaller value.

Therefore, as shown in broken lines in FIG. 9, a communication area A1 which the downlink signal of the first frequency band B1 having a greater transmission power reaches covers a farther and wider area than a communication area A2 which the downlink signal of the second frequency band B2 having a smaller transmission power reaches.

In an area where the communication area A1 and the communication area A2 overlaps each other, the mobile terminals 2 can perform communication both in the first and the second frequency bands B1 and B2, and thus, communication by the mobile terminals 2 can be assured even in the case of large communication traffic.

In the present embodiment, it is assumed that the base station 1 transmits downlink signals in two frequency bands B1 and B2. Therefore, as shown in FIG. 10, first signals I1 and Q1 whose subcarriers are included in the first frequency band B1, and second signals I2 and Q2 whose subcarriers are included in the second frequency band B2 are outputted from the IFFT section 8.

The first signals I1 and Q1 and the second signals I2 and Q2 are inputted to the signal processing section (a peak power suppressing circuit of the present embodiment) 9 in a subsequent stage, and are subjected to predetermined signal processing in the processing section 9.

[Configuration of the Peak Power Suppressing Circuit]

Figure 11:
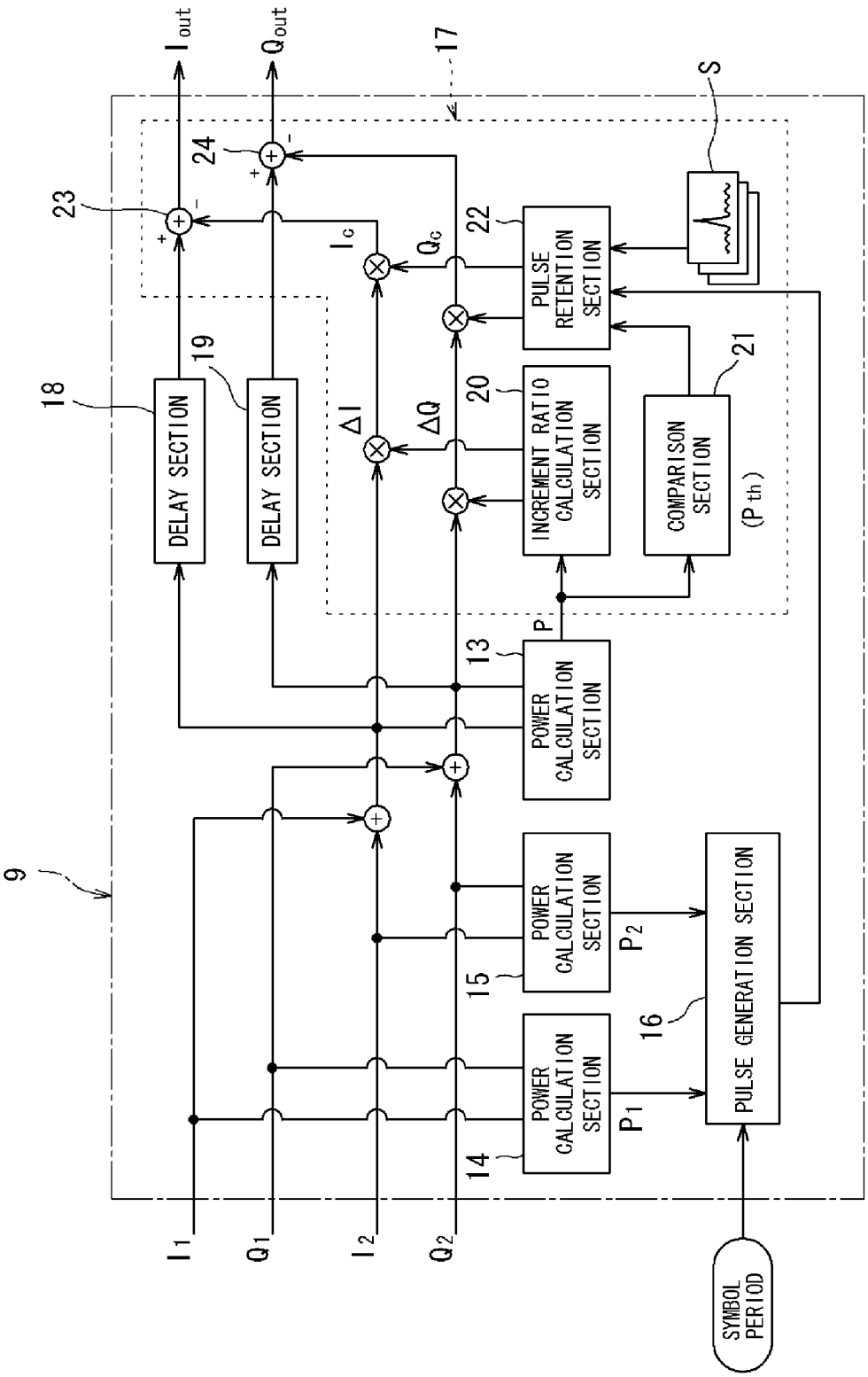
FIG. 11 is a functional block diagram of a peak power suppressing circuit according to the third embodiment.

FIG. 11 is a functional block diagram of the peak power suppressing circuit according to the third embodiment.

As shown in FIG. 11, the peak power suppressing circuit 9 (FIG. 11) of the present embodiment is different from the peak power suppressing circuit 9 (FIG. 3) of the first embodiment in that the peak power suppressing circuit 9 (FIG. 11) of the present embodiment further includes power calculation sections 14 and 15 and a pulse generation section 16.

Hereinafter, common components and functions in the present embodiment and the first embodiment are denoted by the same reference characters and description thereof will be omitted. Differences between the present embodiment and the first embodiment will be mainly described.

Hereinafter, a synthesized signal of the first signals I1 and Q1 and the second signals I2 and Q2 will be simply referred to as an "IQ baseband signal" or an "IQ signal".

Further, an instantaneous power of the first signals I1 and Q1 is defined as P1, an instantaneous power of the second signals I2 and Q2 is defined as P2, and an instantaneous power of the IQ baseband signal is defined as P (=P1+P2).

In the peak power suppressing circuit 9 of the present embodiment, the power calculation section 14 calculates an instantaneous power P1 ($=I1^2+Q1^2$) of the first signals I1 and Q1, that is, a square sum of an I component (I1) and a Q component (Q1) of the first signals I1 and Q1. The power calculation section 15 calculates an instantaneous power P2 ($=I2^2+Q2^2$) of the second signals I2 and Q2, that is, a square sum of an I component (I2) and a Q component (Q2) of the second signals I2 and Q2.

[Configuration of the Pulse Generation Section]

Figure 12:
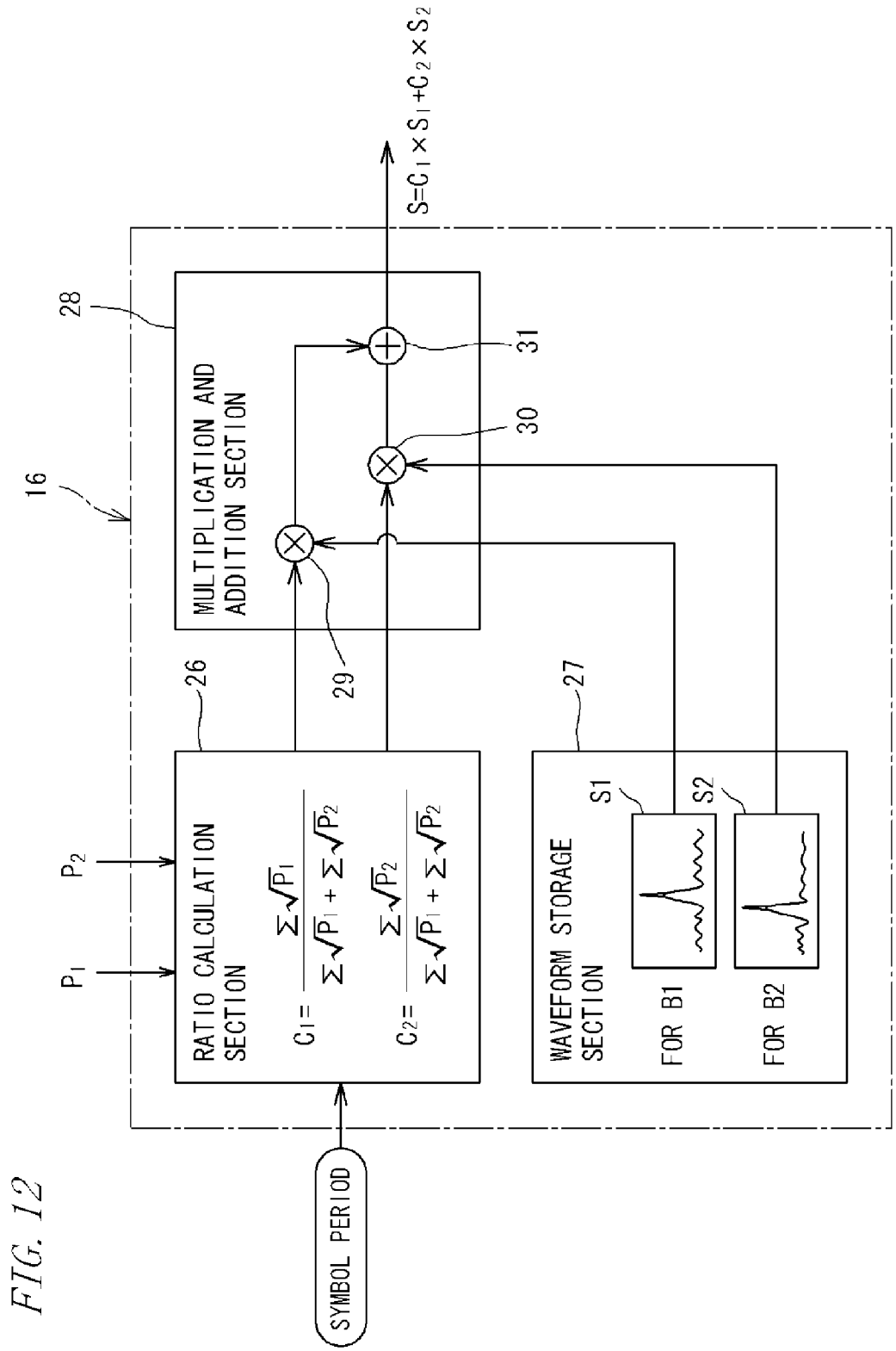
FIG. 12 is a functional block diagram of a pulse generation section.

FIG. 12 is a functional block diagram of the pulse generation section 16. The pulse generation section 16 generates a cancellation pulse S by: multiplying synthesized pulses S1 and S2, which are determined in advance for the respective first and second frequency bands B1 and B2, by relative ratios C1 and C2 of average powers for the frequency bands B1 and B2, respectively; and then summing the resultant values. The pulse generation section 16 includes a ratio calculation section 26, a waveform storage section 27, and a multiplication and addition section 28.

Of these, the waveform storage section 27 is implemented as a storage device such as a memory in which the synthesized pulses S1 and S2 for the respective frequency bands B1 and B2 are stored. Each of the synthesized pulses S1 and S2 is obtained, as in the case of the first embodiment, by synthesizing a basic pulse Sa and an auxiliary pulse Sb (FIG. 4).

The synthesized pulse S1 for the first frequency band B1 is obtained by synthesizing an auxiliary pulse Sb to a basic pulse Sa which consists of a real part I waveform obtained by subjecting a plurality of subcarriers included in the first frequency band B1 to inverse Fourier transformation in the IFFT section 8, which is also used for the transmission signal.

The synthesized pulse S2 for the second frequency band B2 is obtained by synthesizing an auxiliary pulse Sb to a basic pulse Sa which consists of a real part I waveform obtained by subjecting a plurality of subcarrier included in the second frequency band B2 to inverse Fourier transformation in the IFFT section 8, which is also used for the transmission signal.

Meanwhile, the instantaneous power P1 of the first signals I1 and Q1 calculated by the power calculation section I4 and the instantaneous power P2 of the second signals I2 and Q2 calculated by the power calculation section I5 are inputted to the ratio calculation section 26. Using these instantaneous powers P1 and P2, the ratio calculation section 26 calculates relative ratios C1 and C2 of average powers for the respective frequency bands B1 and B2.

$$C1 = \Sigma\sqrt{P1}/(\Sigma\sqrt{P1} + \Sigma\sqrt{P2})$$

$$C2 = \Sigma\sqrt{P2}/(\Sigma\sqrt{P1} + \Sigma\sqrt{P2})$$

As shown in the equations, the relative ratios C1 and C2 of average powers of the respective frequency bands B1 and B2 are determined by the following manner: square roots $\sqrt{P1}$ and $\sqrt{P2}$ of the instantaneous powers P1 and P2 of the frequency bands B1 and B2 are accumulated for a predetermined sampling period, respectively, and the accumulated values $\Sigma\sqrt{P1}$ and $\Sigma\sqrt{P2}$ are each divided by a sum of the accumulated values of the frequency bands B1 and B2 ($\Sigma\sqrt{P1} + \Sigma\sqrt{P2}$).

The ratio calculation section 26 obtains, as a control period, the symbol period of the OFDM symbol, which is a smallest time unit in which a transmission power may greatly fluctuate, and the ratio calculation section 26 is configured to perform the above calculation of the relative ratios C1 and C2 in this symbol period.

Accordingly, the relative ratios C1 and C2 can be calculated in a stable condition where the average power of an IQ baseband signal does not fluctuate very much, and thus, accurate relative ratios C1 and C2 can be obtained.

However, in the case of the LTE, since a resource block (see FIG. 6) is a minimum unit for user allocation, 7 OFDM symbols (1 slot), which correspond to a transmission period of the resource block, may be employed as a control period for calculating the relative ratios C1 and C2.

The multiplication and addition section 28 includes two multipliers 29 and 30 and one adder 31. The multiplier 29 multiplies the relative ratio C1, which corresponds to the first frequency band B1, by the synthesized pulse S1 for the frequency band B1. The multiplier 30 multiplies the relative ratio C2, which corresponds to the second frequency band B2, by the synthesized pulse S2 for the frequency band B2.

Further, the adder 31 adds results of the multiplications performed by the respective multipliers 29 and 30 to generate a cancellation pulse S, and outputs this pulse S to the pulse retention section 22 in the clipping processing section 17. That is, the multiplier-accumulator 16 generates the cancellation pulse S based on the following equation.

$$S = C1 \times S1 + C2 \times S2$$

The multiplication and addition section 28 of the present embodiment compares the relative ratios C1 and C2 calculated in the ratio calculation section 26 with a predetermined threshold, and determines fluctuations thereof. Only when the relative ratio C1 or C2 has fluctuated to an extent exceeding the threshold, the multiplication and addition section 28 performs multiplication and summation using the relative ratios C1 and C2 after the fluctuation, and outputs a resultant cancellation pulse S to the pulse retention section 22.

Therefore, unless the relative ratio C1 or C2 fluctuates to some extent, the multiplication and addition section 28 does not perform the multiplication and summation, and the pulse retention section 22 maintains the existing cancellation pulse S. Therefore, compared with a case where a cancellation pulse S is simply generated every time the relative ratio C1 or C2 fluctuates, arithmetic loads for the circuit can be reduced.

Effects of the Third Embodiment

The cancellation pulse S is a pulse which is obtained by adding: a result of multiplying the relative ratio C1 of an average power of the first signals I1 and Q1 corresponding to the first frequency band B1 by the synthesized pulse S1 for the frequency band B1; and a result of multiplying the relative ratio C2 of an average power of the second signals I2 and Q2 corresponding to the second the frequency band B2 by the synthesized pulse S2 for the frequency band B2.

Accordingly, even when the cancellation signals Ic and Qc, which are obtained by multiplying the increments ΔI and ΔQ by the cancellation pulse S, are subtracted from the original IQ baseband signal, the amplitude of the IQ baseband signal will be canceled in accordance with the average powers for the respective first and second frequency bands B1 and B2.

Therefore, according to the peak power suppressing circuit 9 of the present embodiment, even when there is a difference between average powers in the first and second frequency bands B1 and B2, the transmission power for frequency band B2 having a smaller average power is not reduced more than necessary, by the subtraction of the cancellation signals Ic and Qc. Thus, even in the case of an IQ baseband signal having different average powers for the respective frequency bands B1 and B2, the clipping process can be appropriately performed on the IQ baseband signal without degrading the SNR.

Fourth Embodiment

Figure 13:
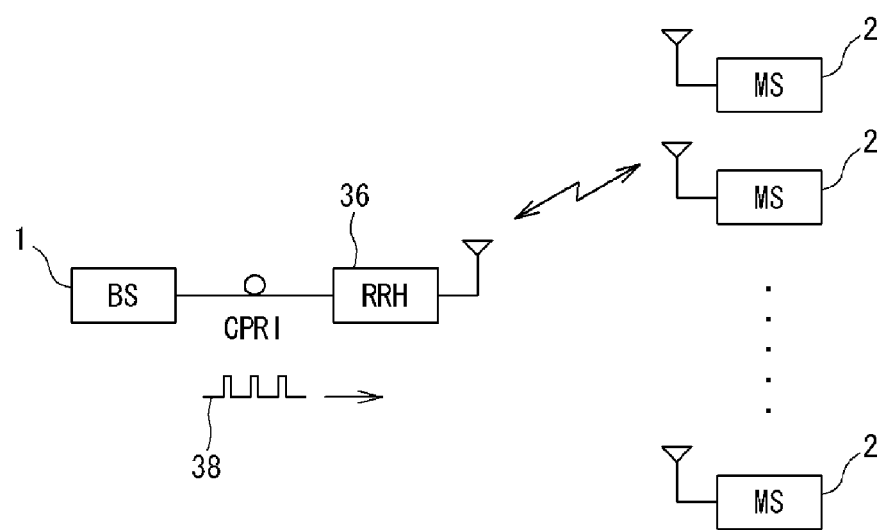
FIG. 13 shows an overall configuration of a radio communication system according to a fourth embodiment.

FIG. 13 shows an overall configuration of a radio communication system according to a fourth embodiment of the present invention.

As shown in FIG. 13, in the radio communication system of the present embodiment, an RRH (Remote Radio Head) 36 is connected to the base station 1 via a CPRI (Common Public Radio Interface). The RRH 36 is provided with a peak power suppressing circuit 9 shown in FIG. 14 according to the fourth embodiment and the power amplification circuit 5 described above.

Moreover, in the present embodiment, the base station 1 transmits a synchronization signal 38 for establishing synchronization with the RRH 36 via a fiber to the RRH 36. The synchronization signal 38 is a clock signal having a 1 ms period that synchronizes with the symbol period of the OFDM.

Figure 14:
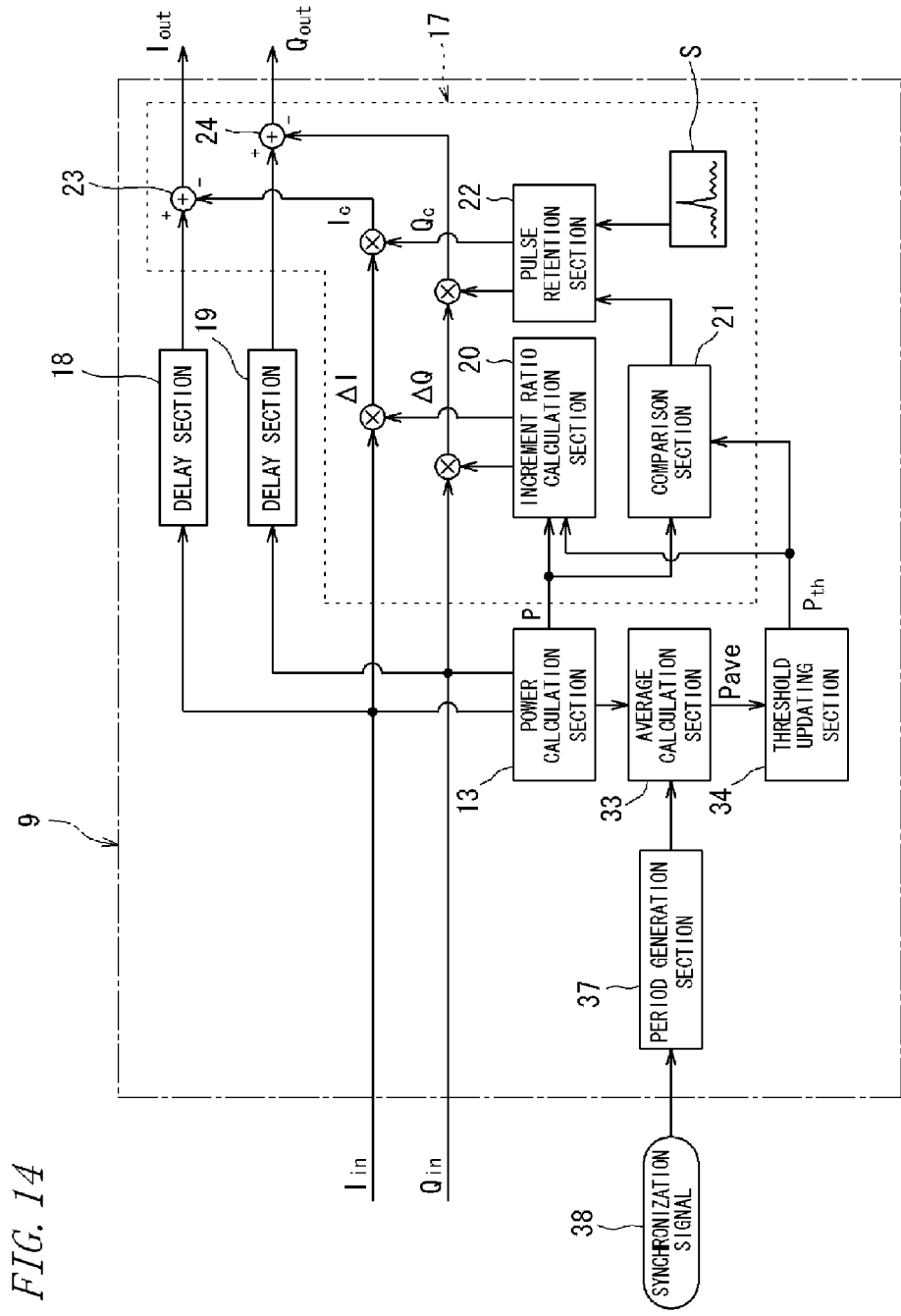
FIG. 14 is a functional block diagram of a peak power suppressing circuit according to the fourth embodiment.

As shown in FIG. 14, the peak power suppressing circuit 9 of the present embodiment is provided with a period generation section 37 into which the synchronization signal 38 is inputted.

The period generation section 37 generates a symbol period based on the synchronization signal 38 obtained from the base station 1, which is an external device, and outputs the generated symbol period to the pulse generation section 16 and the average calculation section 33. Other components in FIG. 14 are the same as those in the peak power suppressing circuit 9 of the second embodiment (FIG. 7), and thus, are denoted by the same reference characters as in FIG. 7, and description thereof will be omitted.

As described above, in the present embodiment, the synchronization signal 38 that synchronizes with the symbol period of the OFDM is obtained from the base station 1, and a symbol period is generated based on the synchronization signal 38. Therefore, the peak power suppressing circuit 9 of the present invention can be mounted in the RRH 36.

[Variations of the Basic Pulse]

Figure 15:
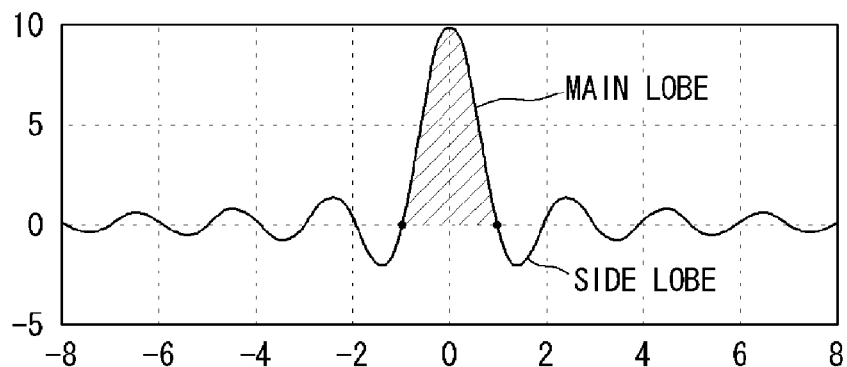
FIG. 15 shows graphs showing variations of a basic pulse in a time domain.
Figure 15:
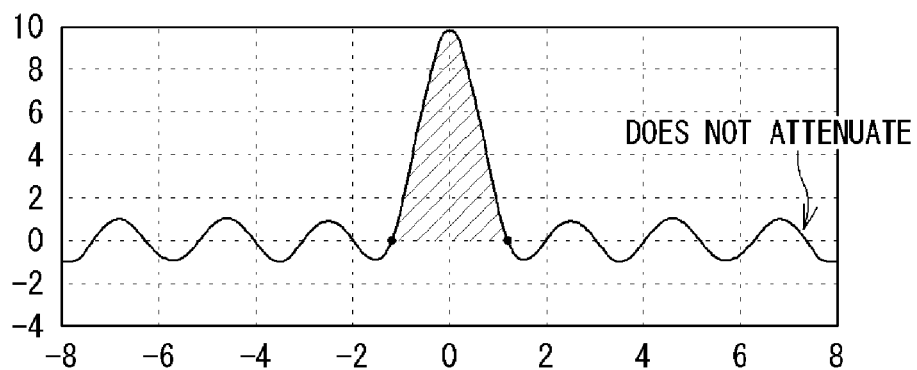
Figure 15:
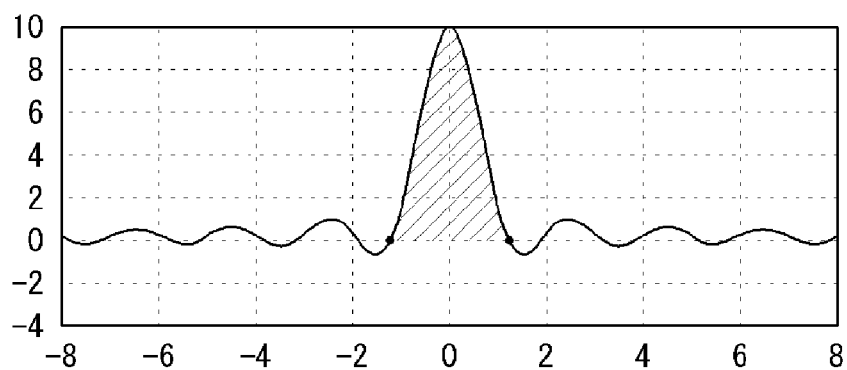

FIG. 15 shows graphs showing variations of the basic pulse Sa in the time domain. In FIG. 15, (a) is a Sinc waveform, (b) is a Chebyshev waveform, and (c) is a Taylor waveform.

All of these waveforms can be mathematically expressed by the following equation (1), and in the case of Sinc waveform, $a_n = n\pi$.

[Equation 1]

$$y = f(x) = \prod_{n=1}^{} \left[1 - \left(\frac{x}{a_n}\right)^2\right] \quad (1)$$

in the case of Sinc, $a_n = n\pi$.

Here, when a section that includes a maximum absolute amplitude to zero amplitudes (the hatched area in FIG. 15) is referred to as a main lobe section, the Sinc waveform has relatively large amplitudes in side lobes, and thus, the rate of energy localized in the main lobe section cannot be improved very much.

In contrast, in the case of the Chebyshev waveform, the amplitude of the side lobes can be reduced by adjusting values of the sequence $a_n$ included in a solution of x that makes the amplitude value zero. However, in this case, the amplitude does not attenuate.

In the case of the Taylor waveform, for several points in the beginning of the sequence $a_n$ (for example, a1 and a2), values of the Chebyshev waveform are used, and for points that follow those points, values of the Sinc waveform are used. Accordingly, the Taylor waveform has attained both of amplitude suppression and attenuation characteristics in the side lobes.

Therefore, when the rate of energy localized in the main lobe section to the entire energy (a squared amplitude) in a predetermined time section T that defines the basic pulse Sa is compared among the Sinc waveform, the Chebyshev waveform, and the Taylor waveform, the rate is 91% in the case of the Sinc waveform, 93% in the case of the Chebyshev waveform, and about 95% in the case of the Taylor waveform, and thus, the Taylor waveform is most advantageous.

Note that the above predetermined time section T is a waveform sampling time period stored in the memory, and is a time period that corresponds to an upper limit number of sampling points. For example, in the case of the LTE, since the number of samples included in 1 symbol period (1/14 ms) is 2048, if it is assumed that 4 times oversampling is performed in the time domain, the upper limit number of sampling points necessary to define the waveform of the basic pulse Sa is: 2048×4=8192.

When the basic pulse Sa that can be used in the present invention is to be specified by a numeral range of the rate of energy localized in the main lobe section in the predetermined time section T, the rate of localized energy is preferably 85% to 99%.

This is because when the rate of localized energy is 100%, the basic pulse Sa becomes an impulse (delta function), and cannot be applied any more to the present invention which has a frequency band limitation, and when the rate of the localized energy is less than 85%, the shape of the pulse becomes too blunt and cannot be used any more.

Therefore, the technical features of the basic pulse Sa used in the present invention are as follows:

Feature 1: The basic pulse Sa can be formed from a waveform whose rate of energy localized in the main lobe section to the entire energy (a squared amplitude) in a predetermined time section T (for example, 1 symbol period) is 85% to 99%.

Feature 2: When the basic pulse Sa is mathematically described, the basic pulse Sa is formed of a waveform expressed by the equation (1) above, which has symmetry in the time domain.

Feature 3: More specifically, the basic pulse Sa is formed of a Sinc waveform, a Chebyshev waveform, or a Taylor waveform. Of these, the Sinc waveform is a waveform composed of the real part (I signal) obtained by subjecting a plurality of carrier waves in a frequency band to inverse Fourier transformation, with their amplitudes made identical to each other and with their phases made zero.

[Other Modifications]

The embodiments disclosed in the present invention are all illustrative and not restrictive. The scope of the invention is indicated by the appended claims, and all changes which come within the meaning and range of equivalency of the claims are therefore intended to be embraced therein.

For example, in the second embodiment, an exemplary case where the base station 1 uses the two frequency bands B1 and B2 has been described. However, even in a case where two or more frequency bands are to be used, the peak power suppressing circuit 9 of the present invention can be configured.

Moreover, the peak power suppressing circuit 9 of the present invention can be applied not only to a communication device complying with the LTE but also to a communication device complying with the W-CDMA.

In the W-CDMA, a transmission power of the base station 1 is configured to be controlled by a closed loop transmission power control, and this control period serves as a minimum time unit for controlling the transmission. Specifically, the control period is one fifteenth of one radio frame period 10 ms (=about 0.667 ms)

Thus, in a case where the peak power suppressing circuit 9 of the present invention is to be used in a transmitter conforming to the W-CDMA, the control period for the closed loop transmission power control may be employed as a control period for calculating the relative ratios C1 and C2 and updating the threshold Pth.

Moreover, in the above embodiments, an exemplary case where the peak power suppressing circuit 9 that performs the clipping process based on the PC-CFR has been described. However, the present invention can also be applied to the peak power suppressing circuit 9 that performs the clipping process based on the NS-CFR.

DESCRIPTION OF THE REFERENCE CHARACTERS 1 base station
2 mobile terminal
3 transmitter
4 transmission processor
5 power amplification circuit
9 signal processing section (peak power suppressing circuit)
13 power calculation section
14 power calculation section
15 power calculation section
16 pulse generation section
17 clipping processing section
20 comparison section
21 increment ratio calculation section 22 pulse retention section
23,24 adder-subtracter
ΔI increment
ΔQ increment
Ic cancellation signal
Qc cancellation signal
S cancellation pulse
Sa basic pulse
Sb auxiliary pulse

The invention claimed is:

1. A peak power suppressing circuit that performs a clipping process on an IQ (In-phase and Quadrature-phase) baseband signal, comprising:
a power calculation section that calculates an instantaneous power of the IQ baseband signal;
a pulse retention section that retains a cancellation pulse that has a frequency component in a frequency band of the IQ baseband signal and a frequency component outside the frequency band; and
a clipping processing section that subtracts, from the IQ baseband signal whose instantaneous power that has been calculated is greater than a predetermined threshold, a cancellation signal obtained by multiplying an increment of the IQ baseband signal from the threshold by the cancellation pulse,
wherein the cancellation pulse is a synthesized pulse obtained by synthesizing a basic pulse which has a frequency component in the frequency band, and an auxiliary pulse which has a frequency component outside the frequency band that precipitously rises in a time period when the basic pulse peaks, the auxiliary pulse having a narrower pulse width and a lower peak level than the basic pulse.

2. The peak power suppressing circuit according to claim 1, wherein
the basic pulse is formed from a waveform whose rate of energy localized in a main lobe section is 85 to 99%.

3. The peak power suppressing circuit according to claim 1, wherein
each of the peak levels of the basic pulse and the auxiliary pulse is set so as to satisfy a desired EVM (Error Vector Magnitude) in the frequency band of the IQ baseband signal and to satisfy a desired adjacent channel leakage ratio (ACLR).

4. The peak power suppressing circuit according to claim 1, wherein
in a case where the peak level of the basic pulse is defined as $\alpha$ and the peak level of the auxiliary pulse is defined as $\beta$, a ratio between the peak levels $\alpha$ and $\beta$ are set so as to satisfy $0.03 \leq \beta/\alpha \leq 0.1$.

5. The peak power suppressing circuit according to claim 1, further comprising:
a threshold updating section that updates the threshold to be used in the clipping processing section, for each control period in which there is a possibility that an average power of the IQ baseband signal temporally fluctuates.

6. The peak power suppressing circuit according to claim 1, further comprising:
a pulse generation section that generates the cancellation pulse so as to be able to cancel the IQ baseband signal in accordance with an average power of each frequency band.

7. A communication device comprising:
a transmitter including:
the peak power suppressing circuit according to claim 1; and
a power amplification circuit arranged in a subsequent stage thereof.

8. The peak power suppressing circuit according to claim 1, wherein
the basic pulse is formed of a Sinc waveform, a Chebyshev waveform, or a Taylor waveform.

* * * * *